US007013798B2

(12) United States Patent
Arnedo et al.

(10) Patent No.: US 7,013,798 B2
(45) Date of Patent: Mar. 21, 2006

(54) TOASTER

(75) Inventors: Julian Arnedo, Barcelona (ES); Guy Mauffrey, Breuchotte (FR)

(73) Assignee: SEB S.A., Ecully (FR)

(*) Notice: Subject to any disclaimer, the term of this patent is extended or adjusted under 35 U.S.C. 154(b) by 0 days.

(21) Appl. No.: 10/970,836

(22) Filed: Oct. 22, 2004

(65) Prior Publication Data

US 2005/0109218 A1    May 26, 2005

(30) Foreign Application Priority Data

Oct. 24, 2003 (FR) .................... 03 12474
Jul. 30, 2004 (FR) .................... 04 08444

(51) Int. Cl.
*A47J 37/08* (2006.01)

(52) U.S. Cl. .................... 99/326; 99/329 P; 99/389; 99/391

(58) Field of Classification Search .......... 99/326–333, 99/385–391, 393–401, 337, 339, 338, 340; 219/521–525, 385, 386, 391, 393, 494, 497
See application file for complete search history.

(56) References Cited

U.S. PATENT DOCUMENTS

| 2,355,153 | A | * | 8/1944 | Gomersall | .................... 99/391 |
| 2,788,734 | A | * | 4/1957 | Weeks | .................... 99/390 |
| 2,910,929 | A | * | 11/1959 | Sorenson | .................... 99/390 |
| 3,641,921 | A | * | 2/1972 | Toyooka et al. | .................... 99/390 |
| 4,188,865 | A | * | 2/1980 | Bjarsch | .................... 99/327 |
| 4,201,124 | A | * | 5/1980 | Huggler | .................... 99/327 |
| 4,345,515 | A | * | 8/1982 | Holt | .................... 99/393 |
| 4,404,899 | A | * | 9/1983 | Weiss | .................... 99/332 |
| 4,878,423 | A | * | 11/1989 | Birkert et al. | .................... 99/332 |
| 4,976,195 | A | * | 12/1990 | Cavazos | .................... 99/391 |
| 4,986,173 | A | * | 1/1991 | Hahnewald et al. | .......... 99/338 |
| 5,095,814 | A | | 3/1992 | Ott et al. | |
| 5,653,158 | A | | 8/1997 | Balandier et al. | |
| 5,771,780 | A | | 6/1998 | Basora et al. | |

FOREIGN PATENT DOCUMENTS

EP        0 845 235 A1    6/1998

* cited by examiner

*Primary Examiner*—Timothy F. Simone
(74) *Attorney, Agent, or Firm*—Browdy and Neimark, PLLC

(57) ABSTRACT

A toaster having: a frame enclosing an open heating chamber; a bread supporting carriage mounted in the chamber and vertically movable relative to the frame, the carriage being retainable in a lowered position for toasting; an extension piece fixed to the carriage; a restoring element coupled between the frame and the extension piece for urging the carriage upwardly away from the lowered position to a first bread discharge position; and a control mechanism for controlling the position for the carriage. The control mechanism includes: a lever mounted for rotation about a first axis, a crank element extending perpendicular to the first axis and connected to the lever for rotation as a unit therewith, and a cam device connected to the extension piece and engaged by the crank element at a location spaced from the first axis for converting rotational movements of the actuating lever into vertical movements of the carriage.

16 Claims, 7 Drawing Sheets

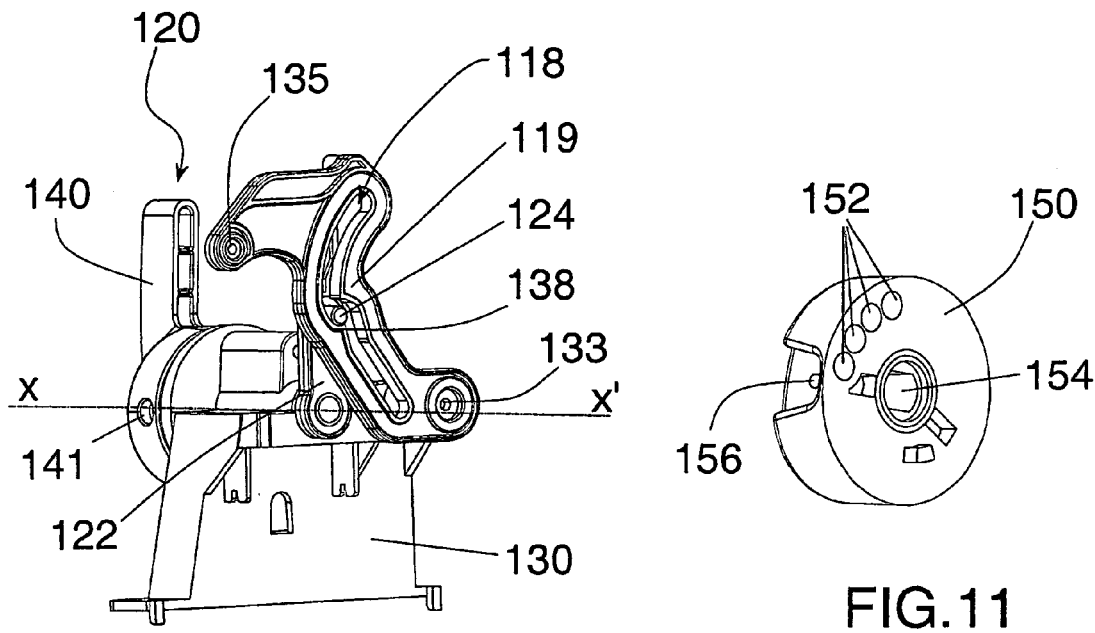
FIG.9
FIG.11
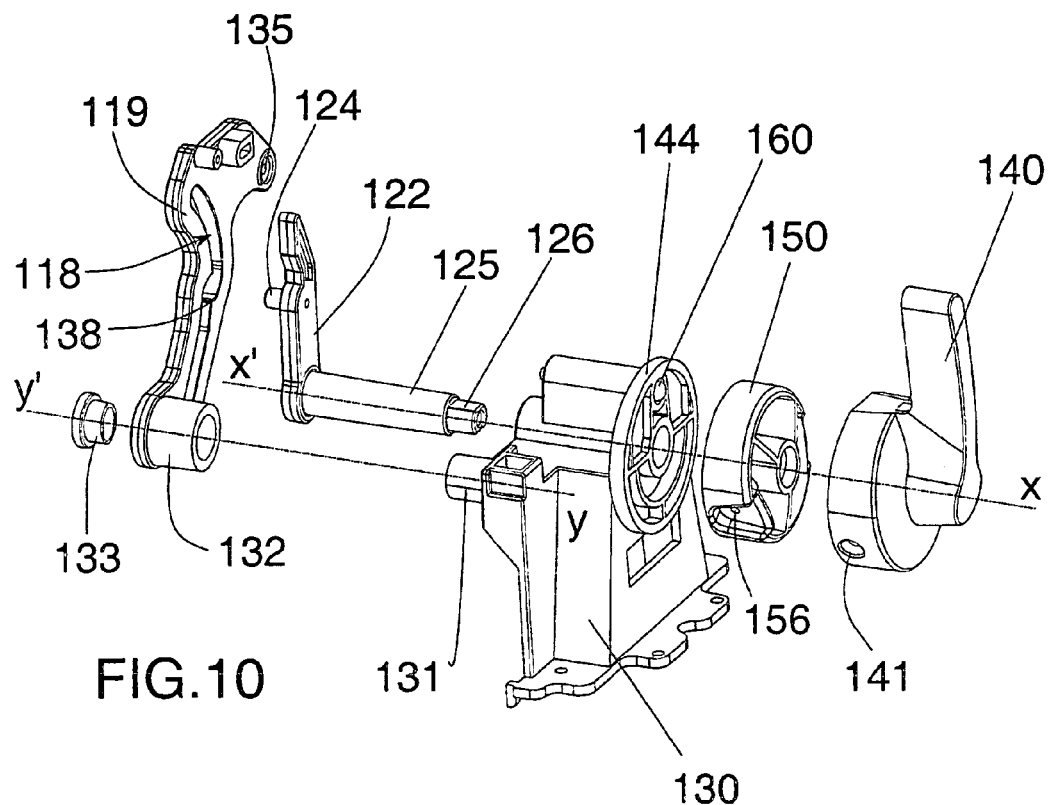
FIG.10

TOASTER

BACKGROUND OF THE INVENTION

The present invention relates to the field of household electric appliances of the toaster type, and more particularly to toasters having a carriage that can be brought into a complementary position, called an "extra lift" position, to facilitate the removal of bread slices having comparatively small dimensions.

As is known, a toaster has a bread-supporting carriage that is able to be displaced within a frame, or enclosure, in order to permit bread slices to be brought into facing relationship with heating elements in order to be toasted. Displacement of the carriage can be effected by a manual operation, or by a spring or a restoring element, or even by a motorized mechanism.

The published patent document EP 0 845 235 describes a toaster having a spiral restoring spring provided with a recess at one of its ends supporting the carriage. This particular form of construction permits, with the aid of an actuation arm, a complementary displacement of the carriage toward an upper level for discharge, or removal, of the bread.

While such an appliance permits easy recovery of small pieces of bread and reduction of the risks of burning, it is necessary for the user to hold the arm in a raised position in order to gain access to the bread pieces. In addition, such a device allows for only one complementary raised position.

U.S. Pat. No. 5,095,814 discloses a toaster having a bread-supporting carriage that is movable by a control element between a bread discharge position and a lowered toasting position. The carriage can be further raised from its discharge position in order to facilitate the extraction of small slices of bread, with the aid of a device having a lever arm actuated by a knob that is distinct from the element for controlling the carriage.

Moreover, a number of ergonometric studies have indicated that a substantial number of consumers are critical of having to actuate the control button of the carriage in translation toward the bottom and of the substantial force needed to block the carriage in the lowered position.

Another drawback of these toasters having a control button slides vertically is the presence of a slot in the wall of the housing, or case, which represents a possible entrance for dirt and bread crumbs into the toaster.

BRIEF SUMMARY OF THE INVENTION

The present invention eliminates these drawbacks by providing a toaster comprising:
- a frame enclosing at least one heating chamber associated with heating elements, the heating chamber having an open top;
- a bread supporting carriage mounted in the chamber and vertically movable relative to the frame, the carriage being retainable in a lowered position for toasting;
- an extension piece fixed to the carriage;
- restoring means coupled between the frame and the extension piece for urging the carriage upwardly away from the lowered position to a first bread discharge position; and
- control means for controlling the position for the carriage, wherein the control means comprise:
- an operating lever mounted for rotation about a first axis, x–x',
- a crank element extending perpendicular to the first axis and connected to the lever for rotation as a unit therewith, and
- a cam device connected to the extension piece and engaged by the crank element at a location spaced from the first axis for converting rotational movements of the actuating lever into vertical movements of the carriage.

The presence of a rotatable lever in the controls of the toaster carriage represents a novel architecture that provides, in particular, improved ease of use compared to vertically slidable levers, or knobs. In addition, according to the invention, a single lever permits control of the carriage in order to carry out a toasting cycle, but also for the extra lift of the carriage.

Advantageously, the rotatable operating lever is disposed on one of the lateral walls of the toaster, i.e. on a lateral wall of the toaster frame, and the axis of rotation of the rotatable lever may be parallel to the longitudinal axis of the carriage.

Because the control movement is purely a rotation, it is no longer necessary to provide an open slot in the toaster case, as required for vertical sliding movement of the control levers according to the prior art. As a result, the invention offers a reduced risk of malfunction due to introduction of foreign objects or materials through such a slot, so that the interior of the toaster is maintained as isolated as possible from the exterior.

Moreover, the different angular positions of the lever provide a clearer indication of the exisiting operational state of the toaster.

According to a first embodiment of the invention, the cam device is a slide provided in the extension of the carriage. The slide thus engages with one of the ends of the rod.

Such an embodiment is simple and requires only a small number of movable parts, adding to its reliability.

Advantageously, the restoring means is a spring whose axis is spaced from the axis of rotation of the lever by a distance r, the lever arm of the rod having an effective length R, with the ratio r/R being less that 0.5.

It appears, in effect, important that the position of the spring be appropriately selected relative to the lever arm constituted by a bent rod, in order for the lever arm to have a sufficient effect on the force necessary to lower the carriage. If the ratio r/R is too high, the necessary force will be large and the lever arm will be inefficient.

Advantageously, the toaster has means permitting the rod and the carriage to be maintained at at least two bread discharge levels, or heights.

According to a first form of construction, these means are constituted by at least two stages, or levels, or steps in the slide.

These levels thus permit the control device and thus the carriage to be held stationary at various bread discharge levels, which makes it unnecessary for the user to maintain the control element in a given position with one hand while gripping the toast slices with the other hand. By this solution, the user has available both hands to extract the toast slices from the toaster. This is even more important for the highest toast discharge level, which corresponds to smaller slices of toast that are often more difficult to remove from the toaster.

According to advantageous variations, the slide can have a third, or even a fourth, stage in order to maintain the rod and the carriage at third and fourth levels, respectively, for removal of the bread. This allows at least one supplementary toast discharge position to be provided, which can be necessary in the case of toast slices or products having a small height.

According to a second embodiment of the invention, the cam device consists of a slide provided in an arm mounted for rotation on the toaster frame about an axis of rotation y–y' that is coextensive with one end of the arm and is substantially parallel to the axis x–x'. The other end of the arm slidably engages in a substantially horizontal opening provided in the extension of the carriage.

According to this second embodiment, the cam device provides a supplemental decoupling of the movement by the arm, which permits the rotational movement of the lever to be amplified. The force that the user must apply in order to actuate the lever is thus smaller.

Advantageously, according to this second embodiment, the toaster has means permitting the rod and the carriage to be maintained at at least one bread discharge level permitting loading/unloading of the bread, without having to manually maintain the carriage in this position.

According to this variation, one of the means that can be easily provided consists in that at least one indentation is arranged in the slide. This indentation will have a form approaching a semicircle in order to reliably retain the end of the rod in this position.

As a complement or a variation of this indentation, the means for maintaining may be constituted by notches, catches, or holes for halting rotation of the rotatable lever and a spring blade cooperating with a corrugated surface that provides the blocking notches, etc., or even a system including a ball and corresponding recesses, the ball being fixed and the recesses being disposed on a circular arc on the lever, in such a manner that the ball immobilizes the lever by engaging in one of the recesses. Other arrangements, known per se, can be used.

Advantageously, the slide has, at one of its ends, a sliding zone without a stage, or step, for vertical sliding of the carriage between the toasting position and the first discharge, or removal, position.

By this form of construction, the carriage rises from the toasting position to the first discharge position simply by the action of the restoring means, without interaction with the mechanism for raising the carriage to its discharge positions, thus removing all constraints of the control device to the conventional operation of a toaster.

According to a variation of this form of construction, the slide has a third stage maintaining the bent rod and the carriage at a third bread discharge level.

Preferably, the restoring means is constituted by a spiral spring having contiguous turns and having, at one of its ends, a widened, or flaring, portion supporting the extension of the carriage.

Such an extension, obtained by spreading the last turns of the spring, provides a rim, or edge, against which the extension of the carriage bears, without any other mechanical connection.

Advantageously, the rest position of the spiral spring corresponds to the first bread discharge position. Thus, since the extension of the carriage rests solely on the widened portion of the spring, it is possible to raise the carriage from its first discharge position toward other bread discharge positions without having to apply a force to the restoring means, simply by mechanical engagement between the control means and the extension of the carriage.

In order to facilitate and optimize displacement of the carriage, the toaster has at least one guide rod passing through a cylindrical passage formed in the extension of the carriage.

BRIEF DESCRIPTION OF THE DRAWINGS

FIG. 9 is a perspective, detail view showing the control device of the second embodiment, viewed from the rear.

FIG. 10 is an exploded perspective view of the control device according to the second embodiment.

FIG. 11 is a perspective, detail view of a component of the control device shown in FIGS. 9 and 10.

DETAILED DESCRIPTION OF THE INVENTION

Figure 1:
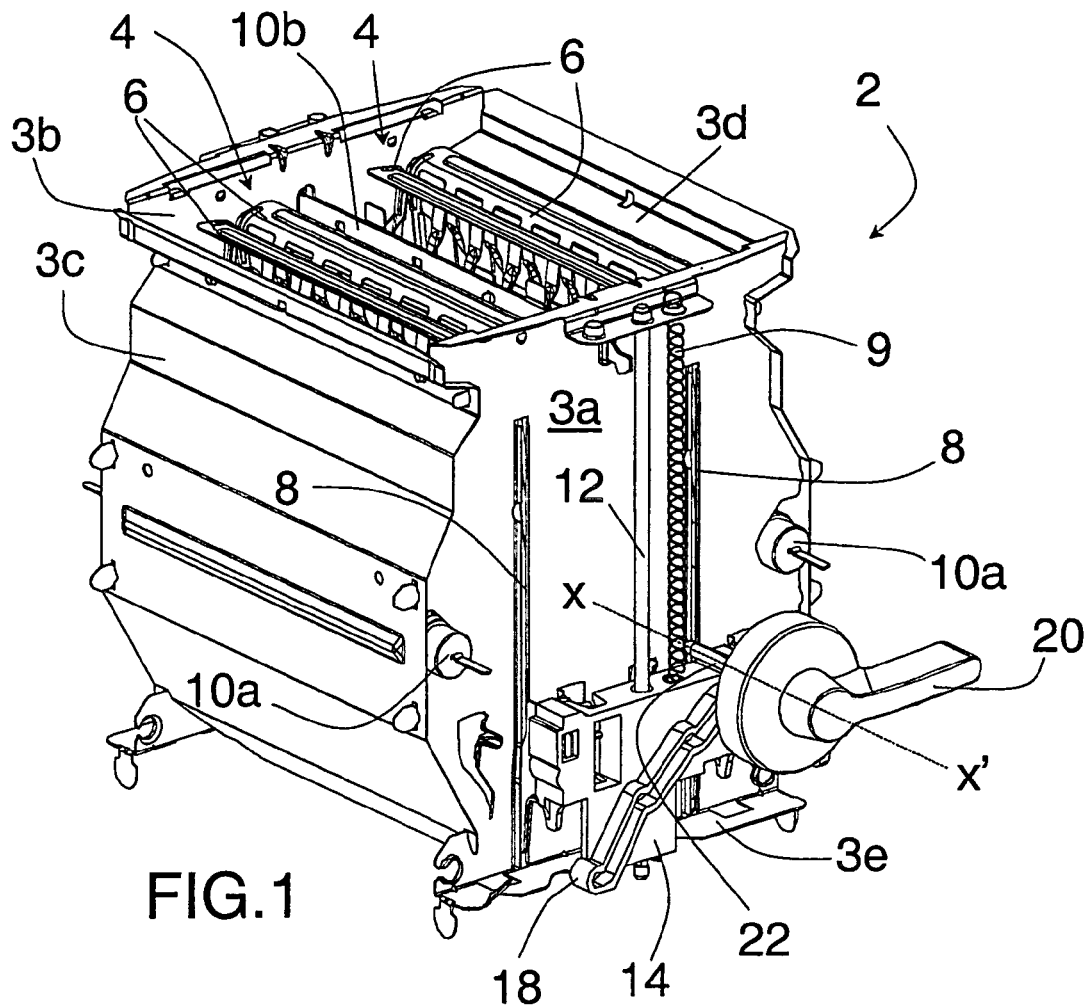
FIG. 1 is a perspective view of a toaster frame, or chassis, according to a first embodiment of the invention.
Figure 2:
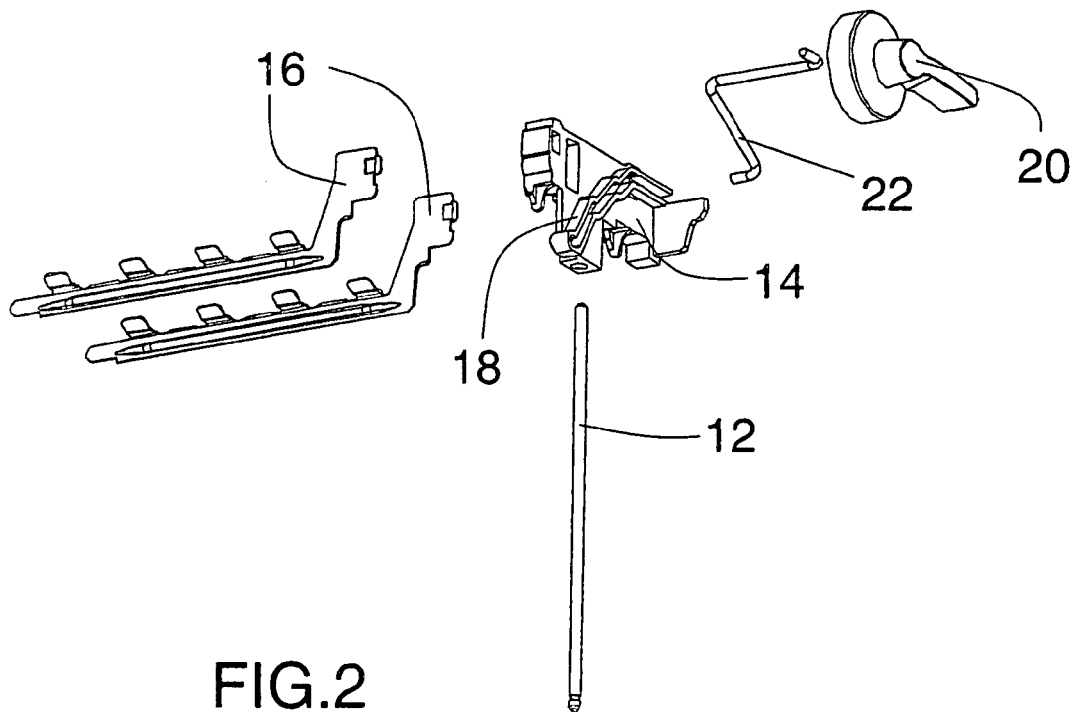
FIG. 2 is an exploded perspective view of the displacement mechanism for the carriage according to the first embodiment of the invention.
Figure 3:
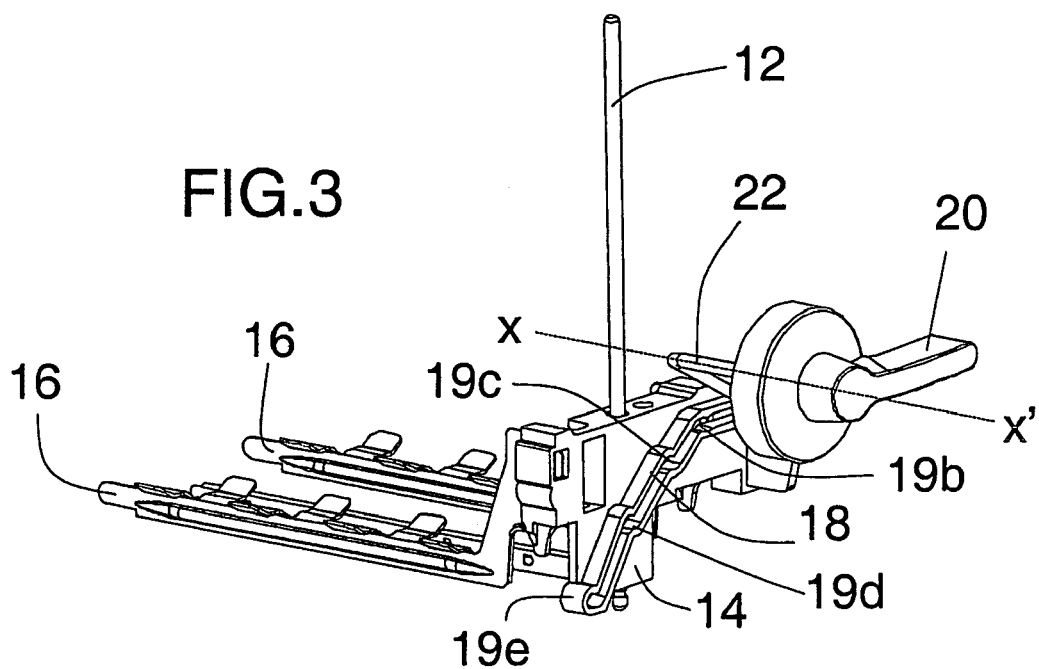
FIG. 3 is a perspective detail view of a mechanism of the first embodiment of the invention.

All essential and novel features of a toaster according to a first embodiment of the invention are illustrated in FIGS. 1–6, which will be described as a group. In these Figures, certain components of a complete toaster, such as its outer case, or housing, are not shown, or are shown only partially. Thus, such as shown in FIG. 1, the toaster includes a chassis 2 that is made up of a front wall 3a; a rear wall 3b, two side walls 3c and 3d and a bottom wall 3e. Side walls 3c and 3d provide reflecting surfaces and carry heating elements 10a, which can be, for example, quartz elements.

Frame 2 is also equipped with a central heating element 10b, which, in this case, can be a flat heating element of relative large extent. This heating element may be constituted by a plate of a material sold under the brand name Samicanite, which is available from Isola Composites, 90101 Delle France, with a resistive wire mounted on the plate.

Thus, walls 3a–3e, as well as central heating element 10b, define two heating, or toasting, chambers 4. At the interior of each heating chamber, two grids 6 are disposed and one or both of these grids is movable in order to grip a slice of bread, as is already known in this art. Also within each chamber there is disposed a bread supporting carriage 16 (FIGS. 2 and 3) that is vertically movable between the associated grids 6. As shown clearly in FIGS. 1–3, each carriage 16 is connected, at the outside of the associated heating chamber 4, to a connecting piece 14 through vertical slots 8 formed in wall 3a to permit carriages 16 to be moved by control elements outside of the heating chambers.

Piece 14 constitutes an extension of carriages 16 and is mounted to be slidable on a vertical guide rod, or column, 12 extending between the upper and lower parts of frame 2.

Figure 6:
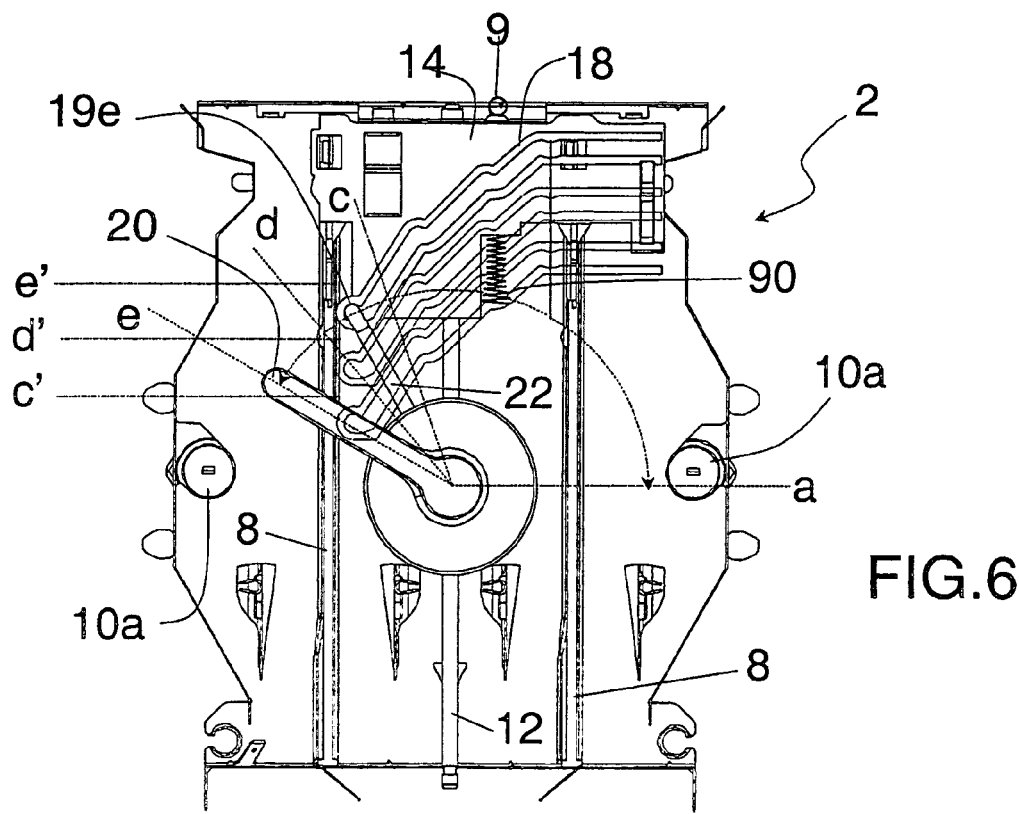

Moreover, a restoring means is disposed between the upper portion of frame 2 and piece 14. In the embodiment illustrated, the restoring means is a spiral spring 9 having contiguous turns. Piece 14 has a vertically extending cylindrical opening through which spring 9 extends. As shown in FIG. 6, the lower end of spring 9 terminates in a widened, or flared, portion 90 that cooperates with the lower edge of piece 14. Portion 90 has a larger diameter than the opening through piece 14 and is thus capable of supporting piece 14.

The advantages, purposes and mode of operation of such a spring are described in detail in the above-cited patent publication EP 0 845 235.

The toaster is equipped with a novel mechanism according to the invention for controlling movement of the carriages. This mechanism includes a lever 20 that is pivotable about an axis x–x' that is substantially perpendicular to wall 3a of frame 2. A rigid, bent rod, or crank arm, 22 is fixed, by one of its ends, to lever 20, substantially in line with axis x–x'. Rod 22 is bent at a midpoint through an angle of substantially 90° and allows a portion of rod 22 to extend substantially parallel to front wall 3a over a distance R from axis x–x'.

In order for pivotal movement of lever 20 and rod 22 to occur without any translation movement, according to this embodiment, the end of rod 22 that connects to lever 20 extends outwardly through the toaster case (which is not shown in FIGS. 1–6), through a simple opening of proper dimensions to prevent any movement of rod 22, and lever 20, other than rotation about axis x–x'. Lever 20 is also located, of course, outside of the case in order to be accessible to a user. Rod 22 is joined to lever 20 at a point outside of the case. Other arrangements can be envisioned for preventing translation movements of rod 22 and lever 20 without departing from the framework of the present invention.

The second end of rod 22 is housed in a groove of a slide 18 that is fixed to piece 14, so that piece 14 and slide 18 form a single unit. Slide 18 generally lies along a circular arc in that it has a substantially horizontal part 19a situated at one of the lateral ends of piece 14, and a curved part extending toward the other lateral end. The curved part has four levels, or stages, or steps, 19b, 19c, 19d and 19e, as designated in FIG. 3.

Figure 5:
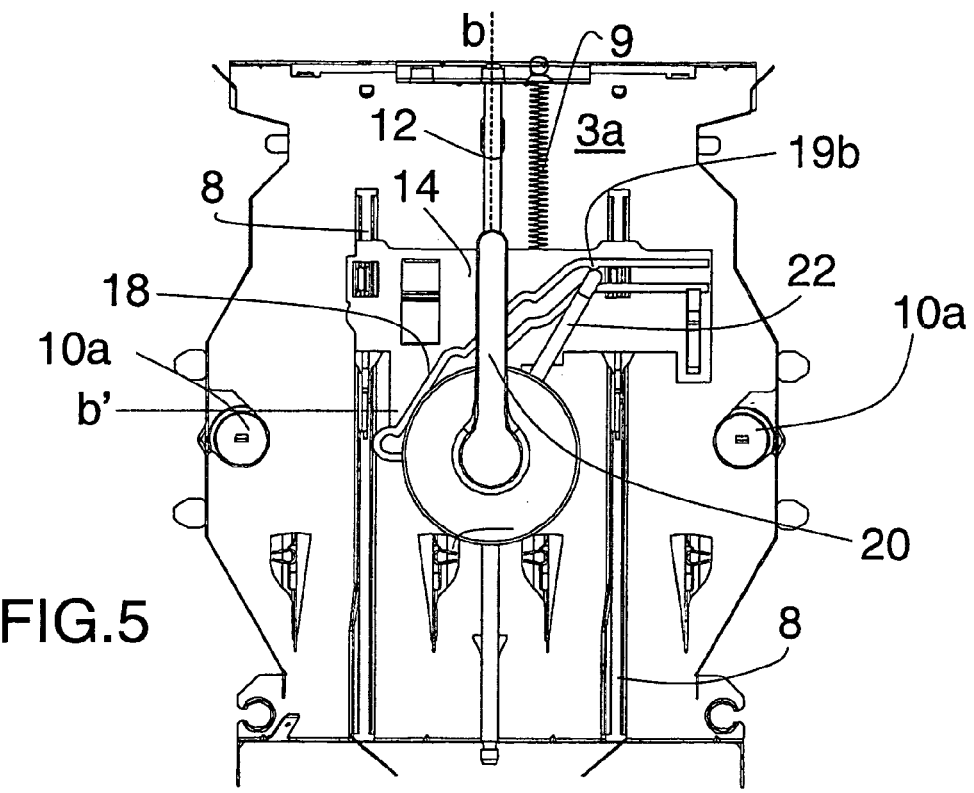

When the toaster is in its normal bread loading/discharge, or rest, state, the second, or outer, end of rod 22 is disposed in horizontal part 19a of slide 18, at one edge of the curved zone, at the same height as the first level 19b of slide 18, as shown in FIG. 5. In this position, lever 20 is in a substantially vertical position b. Carriages 16 are then situated at a level b'.

Figure 4:
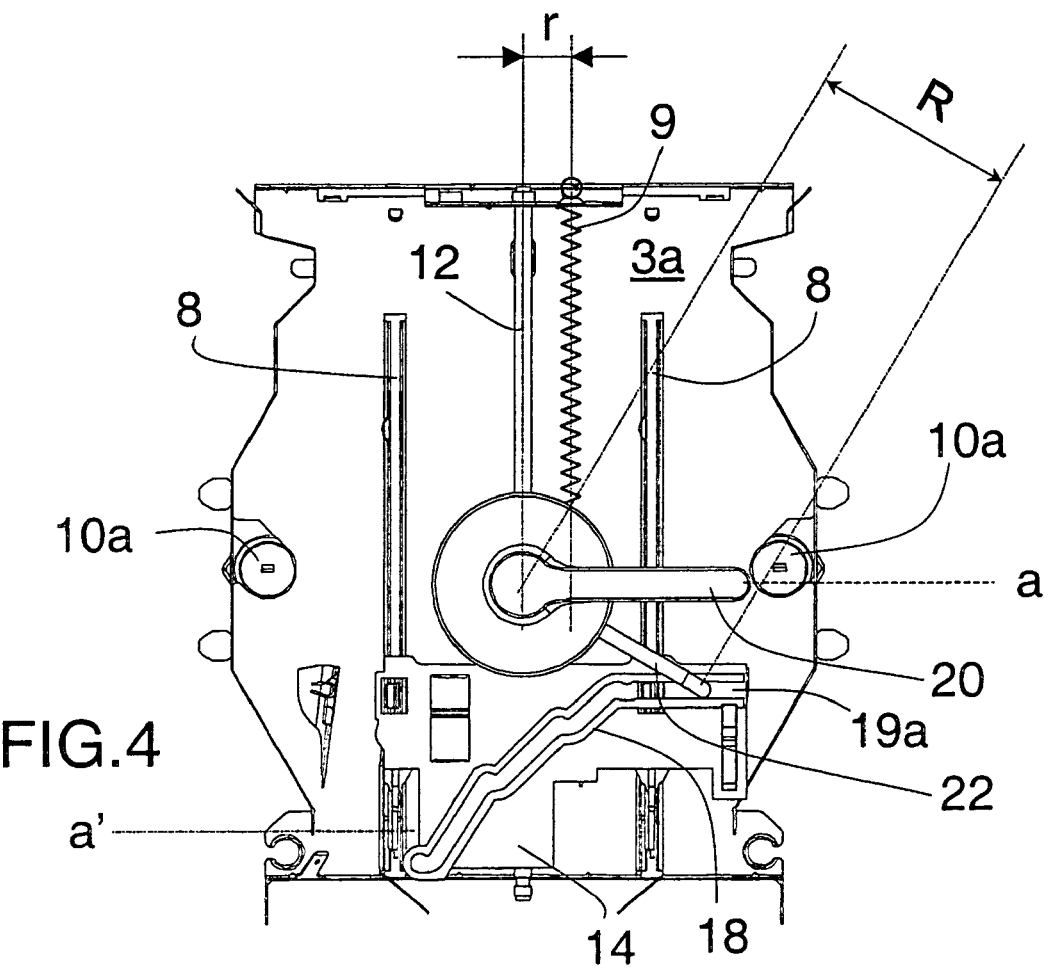
FIGS. 4, 5 and 6 are elevational views of one end of the frame of the toaster according to the first embodiment in respectively different operating states.

According to one of the characteristics of the invention, spring 9 is a spring having contiguous turns, and is oriented substantially vertically, while being spaced from the axis of rotation of lever 20 by a distance r, as illustrated in FIG. 4. Spring 9 is however located at the same side of axis x–x' as the bent portion of rod 22 when the toaster is in its normal bread loading/discharge state. In effect, if spring 9 were positioned at the opposite side of axis x–x', there would be a risk that carriages 16 would be blocked by pivoting in slots 8 of piece 14 during actuation of lever 20.

The distance r is shorter that the distance R, with the result that the torque applied to the slide, and thus to the carriages, by lever 20 is greater than the restoring torque applied to the carriages by the spring. In the example illustrated for the first embodiment, the ratio r/R is in the vicinity of 0.25.

Moreover, in the state shown in FIG. 4, piece 14 rests on spring 9 without extending the contiguous turns of the spring, i.e., without stretching, or expanding, the spring in its axial direction.

In operation, when the user desires to toast a bread slice or slices, he pivots lever 20 manually in the clockwise direction of FIG. 5, in order to pivot rod 22, which then slides in horizontal part 19a of slide 18 in order to drive piece 14, guided by rod 12, downwardly, along with carriages 16, in opposition to the restoring force of spring 9. This movement continues until a retaining, or latching, means (not shown) blocks carriages 16 in the lowered position. These retaining means can be, for example, an electromagnet assembly, as is already well known in this art.

In the lowered position, shown in FIG. 4, lever 20 has a substantially horizontal orientation along line a and carriages 16 are then in the vicinity of a level a'. A toasting cycle can then start, by supplying power to the heating elements for a predetermined time or until a desired degree of toasting has been detected, as is conventional and well known in the art.

At the end of the toasting, or heating, cycle, the supply of power to the heating elements is halted and the carriages are released from the lowered position, all by means well known in the art. The carriages then move upwardly under the effect of restoring spring 9, until reaching the rest position shown in FIG. 5. The restoring force produced by spring 9 induces a sliding movement of rod 22 in the groove provided by part 19a of slide 18, along with a counterclockwise rotation of rod 22.

At this time, carriages 16 are brought into a normal, or first, bread removal position and the user then has the option of pivoting lever 20 further in the counterclockwise direction to displace the end of rod 22 that is engaged in slide 18 into the curved part thereof. The result will be to further raise piece 14 and thus carriages 16.

This supplemental movement is effected without any force other than that needed to support the carriages 16 and piece 14, since piece 14 is free to move upwardly along spring 19, in the manner described in greater detail in the patent document EP 0 845 235.

The presence of steps 19c, 19d and 19e permits the outer end of rod 22 to be maintained in any one of a plurality of stable positions, in which carriages 16 are positioned at levels c', d', and e', respectively, and lever 20 is correspondingly halted in a respective one of the orientations c, d, or e.

It is however desirable, taking into account the orientation of the curvature of slide 18, that positions c, d and e be in the vicinity of the vertical orientation of the portion of rod 22 that is perpendicular to axis x–x'. This helps to prevent unwanted sliding of the outer end of rod 22 in slide 18.

These supplemental levels thus permit carriages 16 to be brought successively to a series of stable positions that are progressively closer to the upper edge of the toasting chambers, with the result that all types of bread slices that may be wedged, or jammed, in the toaster can be easily extracted safely, and without subjecting the user to burns, while the user has both hands available to grip and remove the slices.

Lever 20 thus permits not only lowering of the carriages into the toasting position, but also moving the carriages into one or more stable extra-lift positions above the normal bread discharge position, in order to facilitate recovery of even small slices of bread or parts of slices that have been retained in the toasting chambers.

A second embodiment of the invention, shown in FIGS. 7–15, is constituted by four-slice toaster 100 having four toasting chambers 104. The frame 102 of this toaster is shown in detail in FIG. 8. In a manner similar to the first embodiment, frame 102 has walls that delimit the toasting chambers. At the interior of those chambers are disposed grids 106, with one or both of the grids in each chamber being movable to grip a bread slice, in a manner similar to grid 6 of the first embodiment. Heating elements are however, in this embodiment, constituted by flat plates 110 of mica, such as Samicanite, on which are wound, or disposed, resistive wires that are to be supplied with electric current in order to generate the required heat for toasting.

Toaster 100 is enclosed by a shell, or case, 101, preferably made of plastic, and is provided with a roof, or top, 103 in the form of a dish that is perforated by a plurality of openings and that can be used as a support for reheating pieces of bread and pastries. The toaster according to the first embodiment of the invention will also, of course, be provided with a similar case and can also be provided with a roof corresponding to roof 103.

The front face of the toaster is provided with two control devices 120 each having, exterior to the case, a control lever 140, with each lever being actuatable to control the operation of two toasting chambers.

Figure 8:
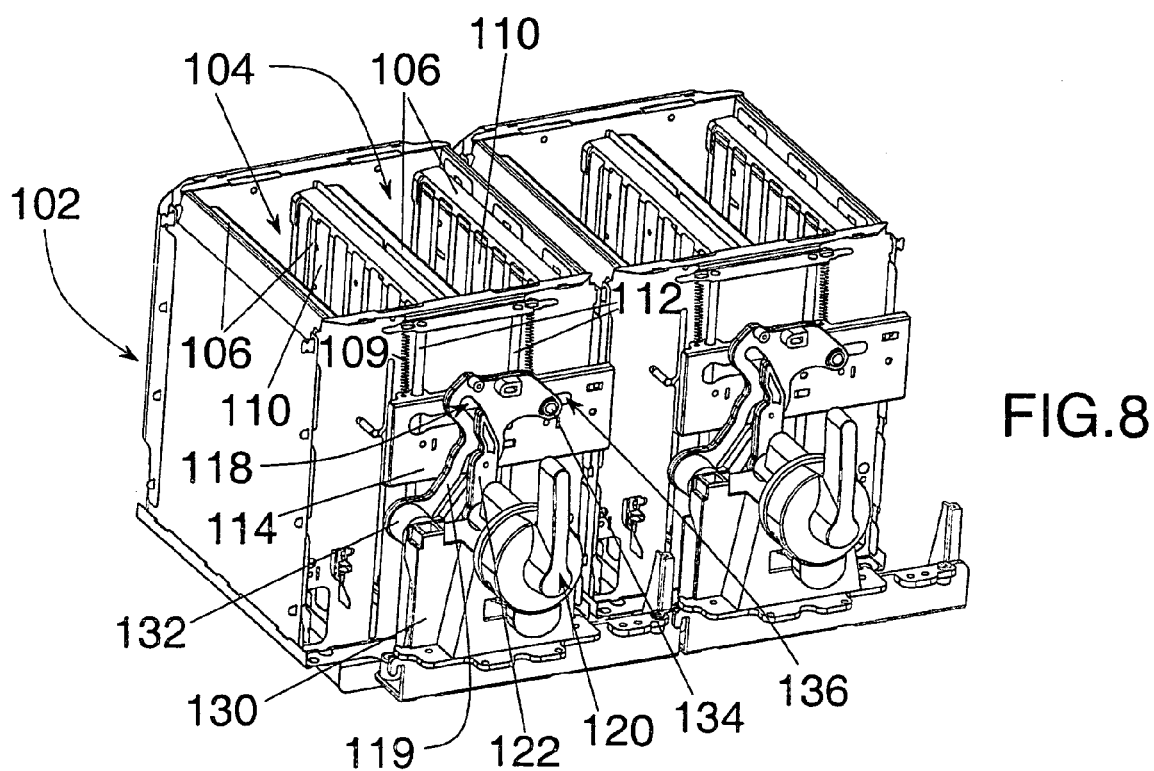
FIG. 8 is a perspective view of the frame of a toaster according to the second embodiment.

As appears most clearly in FIG. 8, the toaster according to the second embodiment is constituted essentially by the juxtaposition, within a single case, of two frames each enclosing two toasting chambers, each frame being similar to the frame of the first embodiment, as shown in FIG. 1. Each frame is associated with its own control device 120.

Figure 7:
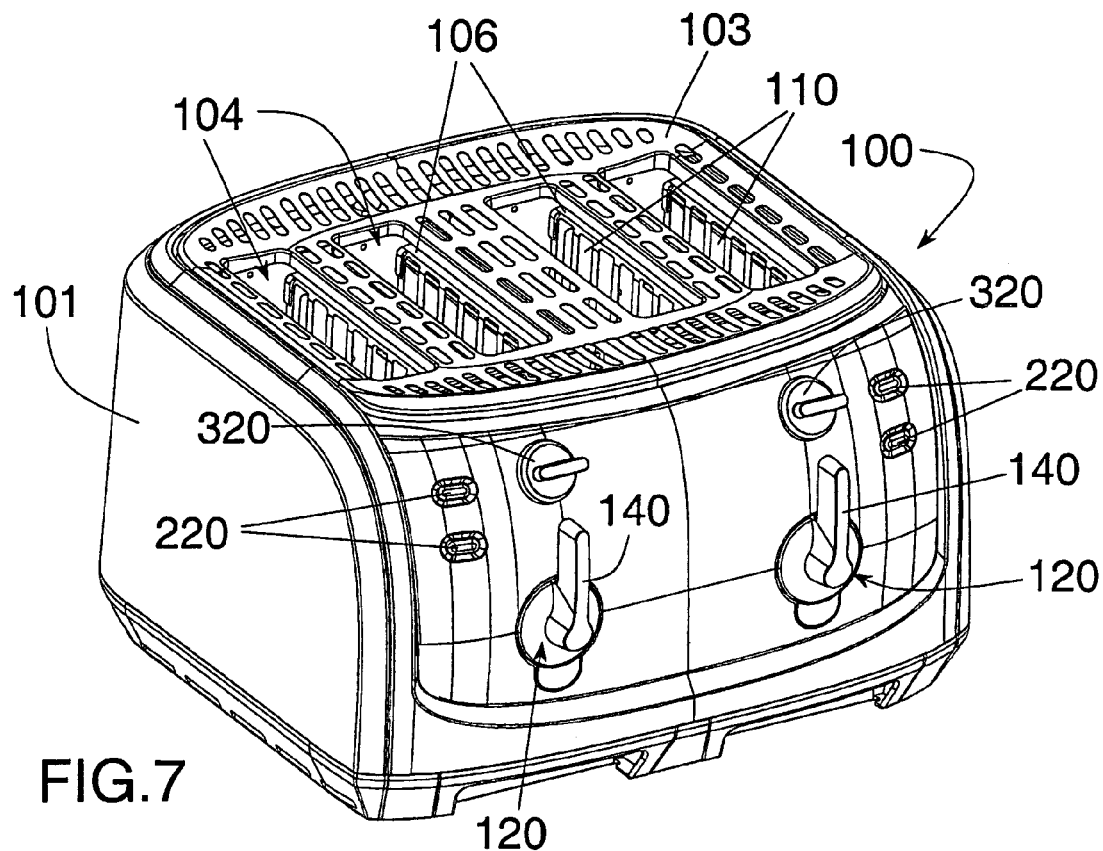
FIG. 7 is a perspective view of a toaster according to a second embodiment of the invention.

FIG. 7 also shows that each pair of toasting chambers is associated with a respective knob 320 for setting the desired degree of toasting in the respective pair of chambers, as well as two function control buttons 220 permitting selection of a specific operation, such as reheating, defrosting, etc.

Devices 120 for controlling movement of bread supporting carriages 116 are shown in detail in FIG. 8. Reference will also be made to FIGS. 9–11 in connection with the description of these devices.

Each device 120 includes an actuation lever 140 connected to a respective bent crank element 122 composed of a shaft 125 that is coaxial with pivot axis x–x' of the associated lever 140, lever 140 thus being mounted on shaft 125 through the intermediary of a circular part 150 to which lever 140 is secured by a screw (not shown) that engages in holes 141 and 156 that are depicted in FIG. 10. Shaft 125 has an end 126 that is of noncircular cross section and that engages in an opening or recess 154 of corresponding shape in part 150 to assure that rotational movement of lever 140 will produce a corresponding rotation of crank element 122.

According to one variation, shaft 125 can form a unit with lever 140, in which case, the crank element, such as element 122, will be a straight piece secured to the opposite end of shaft 125.

Rotatable lever 140, fixed to piece 150, and crank element 122 are disposed to one side and the other of a support 130 fixed to the frame or the case of the toaster. Support 130 is provided with a suitable circular opening through which shaft 125 passes, assuring that shaft 125 will be able to undergo only rotational movement about axis x–x' relative to the toaster frame. Support 130 has one face 144 that is in contact with intermediate piece 150 and a small ball 160 is mounted in a recess in face 144 to protrude slightly therefrom.

Moreover, referring in particular to FIG. 11, intermediate piece 150 has, on its face that is in contact with support 130, a plurality of cavities 152 disposed on the arc of a circle that is centered on axis x–x'. Each of cavities 152 is able to cooperate with ball 160 in order to maintain the lever in a selected one of a plurality of positions, each defined by a respective cavity, as will be described in greater detail below.

At a location spaced from shaft 125, crank element 122 carries a stud, or short pin, 124 that extends substantially parallel to axis x–x' in a direction opposite to the direction in which shaft 125 extends from element 122. Stud 124 engages in a slide, or a channel, 118 formed in an arm 119. Slide 118 has a zone 138 for retaining stud 124 when element 122 has a vertical orientation. Zone 138 is defined by an indentation in the form of a circular arc that approaches a semicircle. Zone 138 is located substantially at the midpoint of slide 118.

Arm 119 is supported by a stud 131 defining an axis y–y' about which arm 119 can pivot. Axis y–y' is parallel to, but offset from, axis x–x'. Arm 119 has a tubular portion that fits around stud 131 and a rivet 133 is secured to stud 131 to prevent arm 119 from sliding relative to stud 131 in the direction of axis y–y'. Tubular portion 132 is disposed at one of the ends of arm 119.

At the other end of arm 119 there is provided a place 135 for holding a rivet 134 or similar element. Rivet 134 is arranged to engage in an opening 136 provided in piece 114 that constitutes an extension of the carriages. Opening 136 of each extension piece 114 preferably has a substantially horizontal orientation.

Each extension piece 114 is similar to extension piece 14 of the first embodiment and each extension piece slides along two vertical rods, or columns, 112 in opposition to the restoring force of two restoring, or return, springs 109. Each spring 109 is arranged between the upper end of a respective frame 102 and the associated extension piece 114.

Springs 109 can be spiral springs composed of contiguous turns. Each spring 109 passes through a vertically extending cylindrical opening in an associated piece 114 and each spring 109 terminates, at its lower end, in an enlarged portion that has a diameter larger than that of the cylindrical opening in the associated piece 114. This allows springs 109 to support pieces 114.

Figure 13:
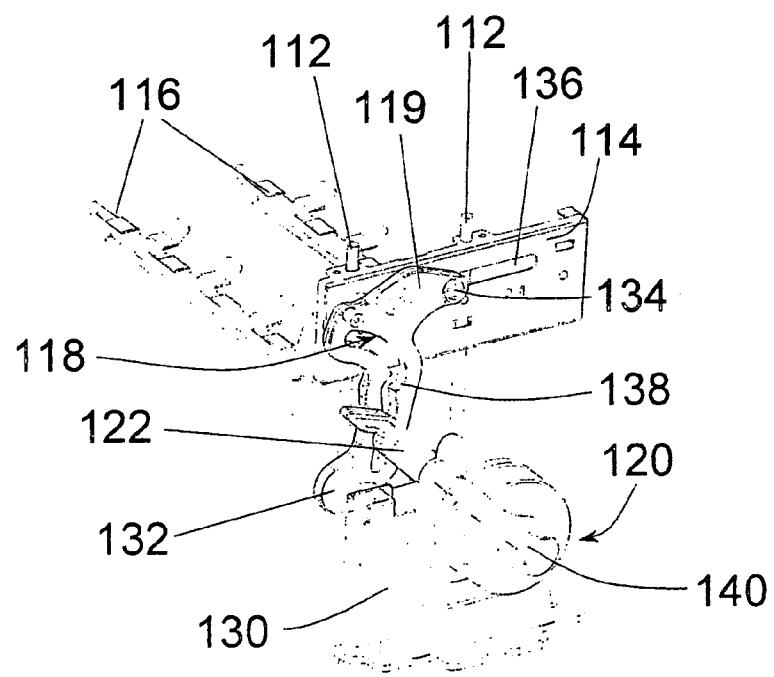
Figure 14:
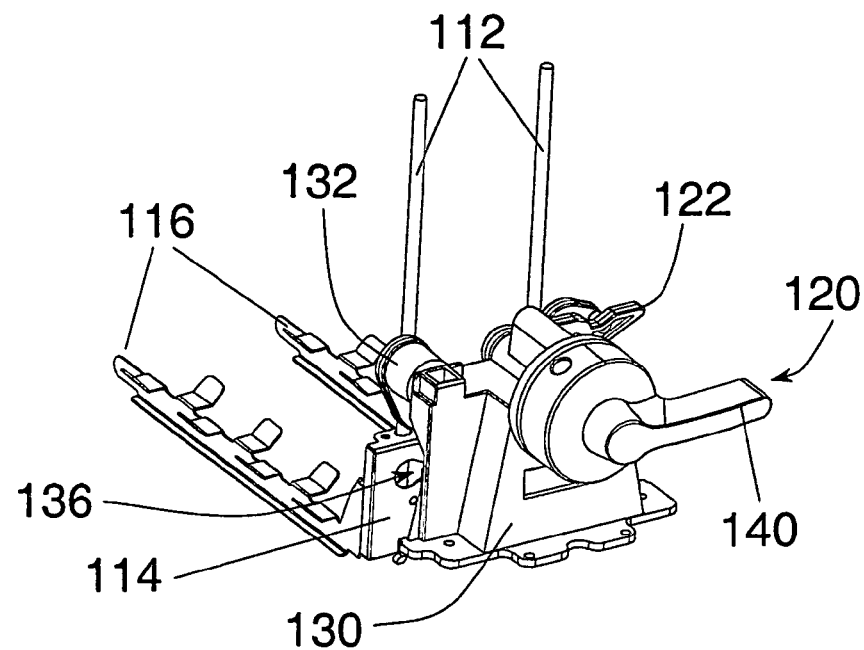
Figure 15:
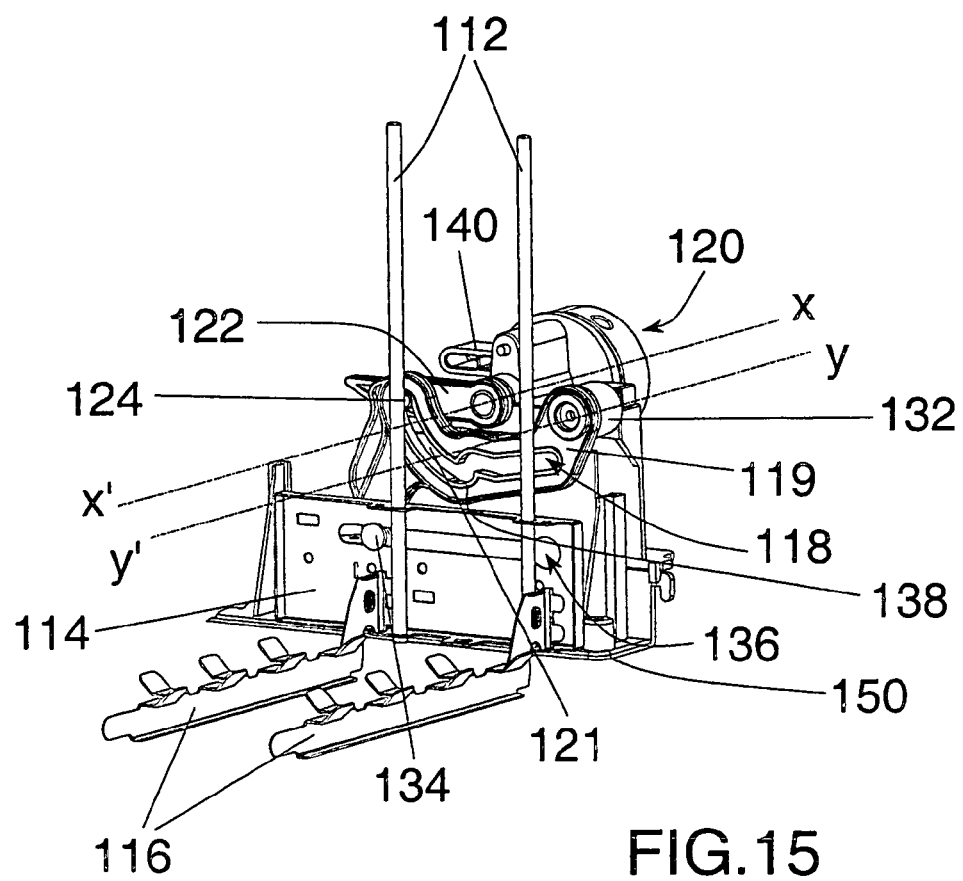
FIG. 15 is a perspective view of the control device according to the second embodiment, viewed from the rear, in the operating state shown in FIG. 14.

As is apparent, the embodiment shown in FIGS. 7–15 is provided with two extension pieces 114 and each extension piece supports two carriages 116, the connection between an extension piece 114 and two carriages 116 being shown most clearly in FIG. 15.

It should be obvious that the present invention can be applied to the control of any number of bread-supporting carriages, with structures according to either the first embodiment or the second embodiment disclosed herein.

Figure 12:
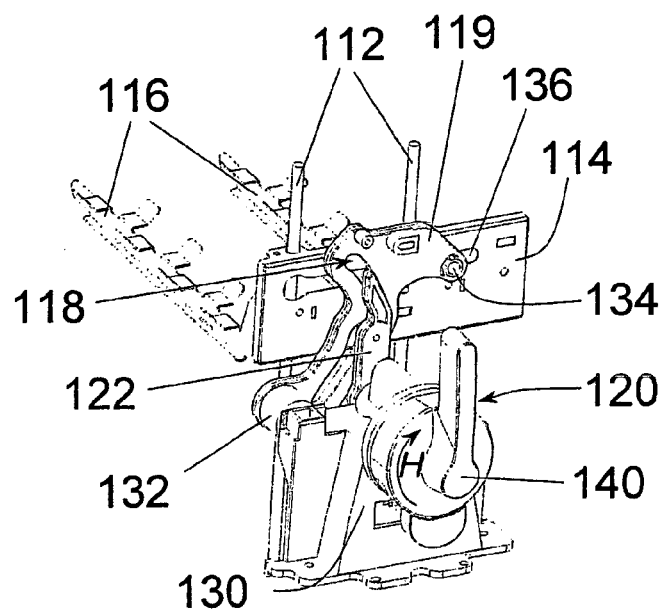
FIGS. 12–14 are perspective, detail views of the control device according the second embodiment in respectively different operating states.

The operation of a toaster according to the second embodiment is illustrated in FIGS. 12–15, showing one control means of a toaster according to the invention. FIG. 12 shows the control means in a state in which carriages 116 are in their bread receiving position, or normal loading/ unloading position. In this state, stud 124 of element 122 is retained in zone 138 of slide 118, as is also shown in FIG. 9. With the control means in this position, the user is able to place slices of bread to be toasted into the toasting chambers.

In order to initiate a heating, or toasting, cycle, the user rotates lever 140 in the clockwise direction, H, in order to move it into a substantially horizontal orientation, such as shown in FIGS. 14 and 15. This movement produces a rotation of element 122 around axis x–x', also in the clockwise direction, H. This results in an interaction between stud 124 of element 122 and slide 118, causing arm 119 to also pivot in the clockwise direction, H, around axis y–y'. As is shown clearly in FIG. 15, stud 124 undergoes a circular movement in part 121 of slide 118, which part does not have a detent zone, so that arm 119 undergoes a continuous rotational movement.

The rotational displacement of arm 119 produces a movement of rivet 134 downwardly along a circular arcuate path. This movement has a horizontal component and a vertical component. The horizontal component involves a movement along opening 136, while the vertical component causes piece 114 to slide downwardly, guided by columns 112, with carriages 116 being carried along with piece 114.

In this position, which is the lowered, or toasting, position, extension piece 114 acts to trigger a toasting cycle, and piece 114 is maintained in this position by any known means (not shown). Such means can be, for example, an electromagnet that cooperates with piece 114 in order to maintain that piece and carriages 116 in the lowered position in opposition to the restoring force produced by springs 109. Movement of extension piece 114 into the lowered position also triggers the supply of heating current to the heating elements by closing an electric circuit for supplying current to those elements, also in any manner that is already known in this art.

At the end of the toasting cycle, the means for holding extension piece 114 in place, such as the electromagnet, releases the piece, allowing it to rise in response to the restoring force produced by springs 109. This movement is accompanied by a rotation of arm 119 in the counterclockwise direction and this, in turn, provokes a rotation, in the same sense, of element 122. These movements are halted upon arrival of stud 124 into detent zone 138, all of the components have been returned to the initial position shown in FIG. 12. The user can then remove toast from the toasting chamber. Alternatively, and in particular when relatively small pieces of bread have been toasted, the user can raise the carriages 116 by an additional amount with respect to the normal discharge position, by rotating lever 140 from its vertical position in the counterclockwise direction, to a position as shown in FIG. 13.

During this additional upward movement, lever 140 can be halted in any one of four different angular positions by cooperation between ball 160 and any one of cavities 152. Passage of ball 160 from one cavity to another is made possible either by the elasticity of the engaging pieces or by allowing ball 160 to be pushed into its recess against the restoring force of a small spring (not shown).

In the illustrated embodiment, piece 150 is provided with four cavities, thus permitting lever 140 to be held in any one of four different angular positions. Passage from the first cavity to following cavities has as its effect to pivot arm 119 upwardly, with rivet 134 then moving upwardly over a circular arcuate path. This movement has a horizontal component that causes rivet 134 to slide along opening 136, and a vertical component that moves extension piece 114, and thus carriages 116, upwardly. It then becomes possible to withdraw small slices of bread more easily while carriages 116 are in a stable position. Thus, when the carriages are in any one of the extra lift positions, the user can have both hands available for gripping the toast slices.

In the operation of the second embodiment, there results an amplification of movement obtained particularly by the fact that the distance between rivet 134 and axis y–y' is greater than the length of slide 118, and due to the fact that the axes x–x' and y–y' are in proximity to one another.

The present invention is, of course, not limited to the two examples described herein, but also covers devices in which the means for holding the handle, or lever, in position are constructed according to equivalent techniques, for example by the provision of notches. It is also possible to utilize any holding means associated with the lever, with the aid of the devices presented herein, or similar devices such as notches.

The invention can also be practiced with a single unit, or means, for simultaneously moving several extension pieces 114 by rotation of the same lever.

This application relates to subject matter disclosed in French Application number FR 03 12474, filed on Oct. 24, 2003, and French Application number FR 04 08444, filed on Jul. 30, 2004, the disclosures of which are incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A toaster comprising:
   a frame enclosing at least one heating chamber associated with heating elements, the heating chamber having an open top;
   a bread supporting carriage mounted in said chamber and vertically movable relative to said frame, said carriage being retainable in a lowered position for toasting;
   an extension piece fixed to said carriage;
   restoring means coupled between said frame and said extension piece for urging said carriage upwardly away from the lowered position to a first bread discharge position; and
   control means for controlling the position of said carriage between the lowered position for toasting, the first bread discharge position and a second bread discharge position higher than the first bread discharge position,
   wherein said control means comprise:
   an operating lever mounted for rotation about a first axis between a first operating position for placing said carriage in the lowered position for toasting, a second operating position for placing said carriage in the first bread discharge position and a third operating position for placing said carriage in the second bread discharge position,
   a crank element extending perpendicular to said first axis and connected to said lever for rotation as a unit therewith, and
   a cam device connected to said extension piece and engaged by said crank element at a location spaced from said first axis for converting rotational movements of said actuating lever into vertical movements of said carriage.

2. The toaster of claim 1, wherein: said frame has a plurality of lateral walls delimiting said at least one chamber; said carriage has a longitudinal axis; said lever is disposed on one of said lateral walls; and said first axis is parallel to the longitudinal axis of said carriage.

3. The toaster of claim 1, wherein said cam device comprises a slide connected to said extension piece.

4. The toaster of claim 1, wherein said control means are constructed to permit said carriage to be maintained at a selected one of at least two different bread discharge levels.

5. The toaster of claim 1, wherein said restoring means is constituted by a spiral spring having contiguous turns and having a lower end provided with an enlarged portion supporting said extension piece.

6. The toaster of claim 5, wherein said spring is in a rest position when said carriage is in the first bread discharge position.

7. The toaster of claim 1, further comprising at least one guide rod passing through a cylindrical passage formed in said extension piece in order to optimize movements of said carriage.

8. A toaster comprising:
a frame enclosing at least one heating chamber associated with heating elements, the heating chamber having an open top;
a bread supporting carriage mounted in said chamber and vertically movable relative to said frame, said carriage being retainable in a lowered position for toasting;
an extension piece fixed to said carriage;
restoring means coupled between said frame and said extension piece for urging said carriage upwardly away from the lowered position to a first bread discharge position; and
control means for controlling the position for said carriage,
wherein said control means comprise:
an operating lever mounted for rotation about a first axis,
a crank element extending perpendicular to said first axis and connected to said lever for rotation as a unit therewith, and
a cam device connected to said extension piece and engaged by said crank element at a location spaced from said first axis for converting rotational movements of said actuating lever into vertical movements of said carriage,
wherein: said cam device comprises a slide connected to said extension piece; said restoring means is a spring that extends along a second axis that is spaced from said first axis by a distance r; said crank element has a lever arm with an effective length R; and the ratio r/R is less that 0.5.

9. A toaster comprising:
a frame enclosing at least one heating chamber associated with heating elements, the heating chamber having an open top;
a bread supporting carriage mounted in said chamber and vertically movable relative to said frame, said carriage being retainable in a lowered position for toasting;
an extension piece fixed to said carriage;
restoring means coupled between said frame and said extension piece for urging said carriage upwardly away from the lowered position to a first bread discharge position; and
control means for controlling the position for said carriage,
wherein said control means comprise:
an operating lever mounted for rotation about a first axis,
a crank element extending perpendicular to said first axis and connected to said lever for rotation as a unit therewith, and
a cam device connected to said extension piece and engaged by said crank element at a location spaced from said first axis for converting rotational movements of said actuating lever into vertical movements of said carriage,
wherein said control means are constructed to permit said carriage to be maintained at a selected one of at least two different bread discharge levels; and, in order to permit said carriage to be maintained at a selected one of at least two different bread discharge levels, said cam device comprises a slide connected to said extension piece and formed to have at least two steps, each step being configured to releasable retain said crank element in a respective position.

10. The toaster of claim 9, wherein said at least two steps comprises three of said steps.

11. The toaster of claim 9, wherein said at least two steps comprises four of said steps.

12. A toaster comprising:
a frame enclosing at least one heating chamber associated with heating elements, the heating chamber having an open top;
a bread supporting carriage mounted in said chamber and vertically movable relative to said frame, said carriage being retainable in a lowered position for toasting;
an extension piece fixed to said carriage;
restoring means coupled between said frame and said extension piece for urging said carriage upwardly away from the lowered position to a first bread discharge position; and
control means for controlling the position for said carriage,
wherein said control means comprise:
an operating lever mounted for rotation about a first axis,
a crank element extending perpendicular to said first axis and connected to said lever for rotation as a unit therewith, and
a cam device connected to said extension piece and engaged by said crank element at a location spaced from said first axis for converting rotational movements of said actuating lever into vertical movements of said carriage,
wherein: the cam device comprises an arm mounted for rotation on said frame about a further axis that is associated with one end of said arm and is substantially parallel to said first axis; said arm is provided with a slide that cooperates with said crank element; and said extension piece is provided with a substantially horizontal opening in which the other end of said arm engages.

13. The toaster of claim 12, wherein said control means are constructed to permit said carriage to be maintained at at least one bread discharge level.

14. The toaster of claim 13, wherein, in order to permit said carriage to be maintained at at least one bread discharge level, at least one indentation is provided in said slide.

15. The toaster of claim 13, wherein, in order to permit said carriage to be maintained at at least one bread discharge level, said lever is provided with notches for holding said lever in defined positions.

16. A toaster comprising:
a frame enclosing at least one heating chamber associated with heating elements, the heating chamber having an open top;
a bread supporting carriage mounted in said chamber and vertically movable relative to said frame, said carriage being retainable in a lowered position for toasting;
an extension piece fixed to said carriage;
restoring means coupled between said frame and said extension piece for urging said carriage upwardly away from the lowered position to a first bread discharge position; and
control means for controlling the position for said carriage,
wherein said control means comprise:
an operating lever mounted for rotation about a first axis, a crank element extending perpendicular to said first axis and connected to said lever for rotation as a unit therewith, and a cam device connected to said extension piece and engaged by said crank element at a location spaced from said first axis for converting rotational movements of said actuating lever into vertical movements of said carriage, wherein: said cam device comprises a slide connected to said extension piece; and said slide has one end provided with a sliding zone without a step for enabling vertical movement of carriage between the lowered position and the first discharge position.

* * * * *